No. 770,943. PATENTED SEPT. 27, 1904.
C. H. TERRY.
SAFETY HOOK.
APPLICATION FILED JAN. 12, 1904.
NO MODEL.

WITNESSES:
H. L. Reynolds.
Beatrice Nivers

INVENTOR
Charles H. Terry.
BY
Emerson R. Newell
ATTORNEY

No. 770,943.

Patented September 27, 1904.

UNITED STATES PATENT OFFICE.

CHARLES H. TERRY, OF BRISTOL, CONNECTICUT.

SAFETY-HOOK.

SPECIFICATION forming part of Letters Patent No. 770,943, dated September 27, 1904.

Application filed January 12, 1904. Serial No. 188,686. (No model.)

*To all whom it may concern:*

Be it known that I, CHARLES H. TERRY, a citizen of the United States, residing at Bristol, Hartford county, Connecticut, have invented certain new and useful Improvements in Safety-Hooks, of which the following is a clear, full, and exact description.

My invention relates to an improvement in "safety-hooks" by this term meaning a hook so constructed that its opening is closed, so as to prevent its disengagement from whatever it is attached.

The object of my invention is to improve and simplify the construction of such devices.

My invention will be defined in the claims annexed to this specification.

Figure 1:
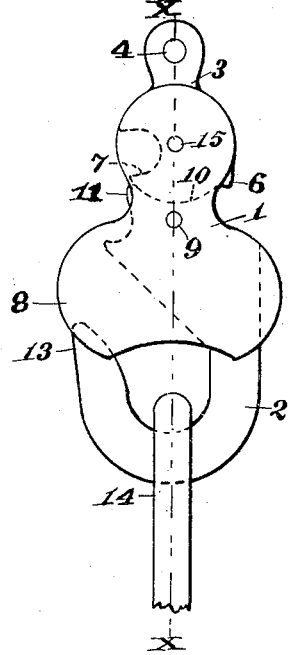
Figure 2:
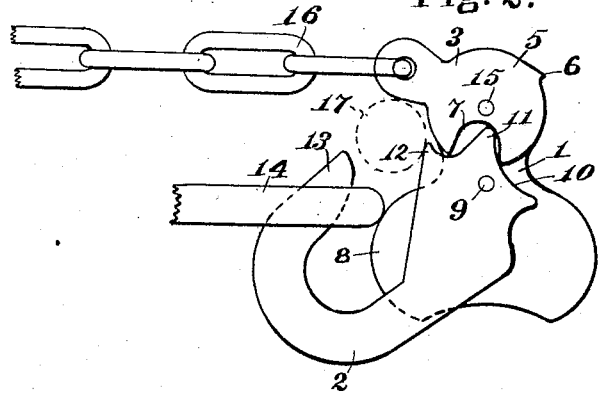

In the drawings accompanying herewith, which show a preferred construction of my invention, Figure 1 represents my device in its operative position or locked; and Fig. 2 represents the same device in unlocked position, one side plate of the frame being removed.

My device comprises a frame or case member or members, to which is pivoted a hook, and a third locking member, which is also designed for the attachment of a chain or other securing device. The frame member and hook are pivoted together and so shaped with reference to each other that in the normal position, or the position which would naturally be assumed when a direct strain was placed upon the device, the frame closes the opening of the hook, thus preventing the possibility of disengagement from whatever the hook is engaged with and yet permitting the hook under a side or lateral strain to swing to one side (when unlocked) in such manner as to clear the point of the hook and permit removal or insertion of a link or other device. In the normal position—that is, the position occupied when the parts are under a direct strain—the locking member engages the hook in such manner as to prevent lateral swinging thereof, and yet when swung to one side it will free the hook, so as to permit its being also swung to one side.

The following is a description of the preferred construction herein shown.

The frame or casing member, as herein shown, consists of two plates 1, between which is placed the base of the hook 2, these parts being secured together by a pin 9, upon which the hook is free to swing. The frame part has a wing-like constuction 8, extending outward over the hook and laterally, of such size and shape as to close the opening of the hook when the latter is in the normal position. Between the two members of the frame is also placed the locking member 3, which is secured by a pivot-pin 15 and has an end projecting beyond the frame and provided with an opening 4, adapted for the attachment of a chain 16 or any other holding or hook-retaining device. The adjacent surfaces of the hook 2 and the locking member 3 are normally in contact and are made of circular shape, having their centers in the pivot-pin 15, the hook being provided with an outwardly-concaved segmental surface 10, while the corresponding surface of the locking member 3 is convex and fits therein. This will permit free turning of the locking member, while preventing turning of the hook.

In order to prevent swinging of the locking member too far in one direction or to prevent the hook being swung in the wrong direction, a stop may be provided—such, for instance, as the peripheral projection 6 on the locking member—which is adapted to engage with a corner of the hook. On the opposite side of the locking member is formed a peripheral recess 7, preferably located on the same side of the median line $x\,x$ as the hook-opening and adapted when the locking member is swung in one direction to receive the point 11 of the hook, and thus permit the hook to be swung to one side, so as to free its point from the frame. The hook may also be provided with a toe or projection 12, adapted to engage the outer surface of the enlarged circular portion 5 of the locking member, thus limiting the extent of swing of the hook.

In the locked position of the parts, as shown in Fig. 1, it is obviously impossible for the link 14 to be freed from the hook, while in the position of the parts as shown in Fig. 2 this link may be readily inserted or removed. It is impossible in the embodiment shown to swing the hook to one side unless the locking member 3 is first swung to the same side of the median line as the hook is swung to open it, and this position would only be assumed by the parts when a pull in the same direction upon both parts is brought thereon. This condition can only occur designedly or by bending the device sharply over some object, and under this last condition the object over which the device is bent will lie in the opening of the hook if it should be swung to the open position, as shown by the dotted object 17 in Fig. 2, and will itself stop the opening and prevent removal of the link 14. A direct strain placed upon the locking member 3 or the hook 2 will tend to throw the parts into locked position. The whole device is of a simple and cheap construction, besides being efficient in its operation.

It is evident that the construction herein shown may be varied and modified in such way as to materially change its appearance without, however, changing the essential principles employed, and therefore without departing from the spirit of my invention. I therefore do not wish to be limited to the exact construction herein shown.

What I claim is—

1. A safety-hook comprising a frame or case, a hook pivoted thereto and in its normal position closed by said frame and also adapted to swing to clear its opening, and a hook-locking member pivoted to said frame and normally engaging the hook to prevent its turning, and adapted, by swinging upon its pivot, to free said hook and permit its turning into the open position.

2. A safety-hook comprising a frame, a hook pivoted thereto and in its normal position closed by said frame and also adapted to swing to clear its opening, and an attaching member pivoted to said frame and normally engaging the hook to prevent its turning, and adapted, by swinging upon its pivot, to free said hook and permit its turning into the open position.

3. A safety-hook comprising a frame, a hook pivoted thereto and in its normal position closed by said frame and also adapted to swing to clear its opening, the pivot end of said hook having a concaved segmental surface, and a locking member pivoted to said frame and normally engaging said concave surface of the hook by a corresponding convex surface and provided with a peripheral recess whereby, when turned, the hook is free so that it may be turned upon its pivot.

4. A safety-hook comprising a frame, a hook pivoted thereto and in its normal position closed by said frame and adapted to swing to clear its opening, said hook having a concaved segmental surface, and a locking member pivoted to the frame and having a segmental surface fitting said segmental surface upon the hook, said locking member having a stop limiting its swing in one direction and a peripheral recess adapted, when swung in position, to permit the hook swinging upon its pivot.

5. A safety-hook comprising a frame, a hook pivoted thereto and in its normal position closed by said frame, and also adapted to swing to clear its opening, said hook having a concaved segmental surface, an attaching member pivoted to the same and having a corresponding convexed surface adapted to engage the said surface of the hook and also having a peripheral recess adapted, when swung in position, to permit swinging of the hook, said attaching member having a projection beyond said frame adapted for securement to a hook-retaining means.

6. A safety-hook comprising a frame, a hook and a locking member therefor both pivoted to the frame, said frame being adapted to close the hook-opening when the hook is under a direct strain, the locking member being adapted for attachment of the chain or equivalent holding device thereto and, when under direct strain, engaging the hook to prevent its swinging into the open position, said locking member being adapted to swing under a side strain to free the hook and the hook being adapted when freed to swing under a side strain into open position.

7. A safety-hook comprising a frame consisting of two opposed plates, a hook pivotally secured between said plates, said plates extending to close said hook in its normal position but clearing the hook when the latter is swung to one side, and a locking member pivoted between said frame-plates, said locking member and hook having respectively convex and concave contacting surfaces, the locking member also having a recess adapted, when swung into position, to free the hook and permit its turning.

8. A safety-hook comprising a frame consisting of two opposed plates, a hook pivotally secured between said plates, said plates extending to close said hook in its normal position but clearing the hook when the latter is swung to one side, and a locking member pivoted between said frame-plates, said locking member and hook having respectively convex and concave contacting surfaces, the locking member also having a recess adapted, when swung into position, to free the hook and permit its turning, and also provided with means for securement thereto of another object.

Signed at New York, N. Y., this 11th day of January, 1904.

CHARLES H. TERRY.

Witnesses:
EMERSON R. NEWELL,
HENRY L. REYNOLDS.